United States Patent
Zhou (10) Patent No.: US 8,234,233 B2
(45) Date of Patent: Jul. 31, 2012

(54) SYSTEM AND METHOD FOR COMBINING BREADTH-FIRST AND DEPTH-FIRST SEARCH STRATEGIES WITH APPLICATIONS TO GRAPH-SEARCH PROBLEMS WITH LARGE ENCODING SIZES

(75) Inventor: Rong Zhou, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 543 days.

(21) Appl. No.: 12/422,746

(22) Filed: Apr. 13, 2009

(65) Prior Publication Data
US 2010/0262574 A1 Oct. 14, 2010

(51) Int. Cl.
G06F 17/30 (2006.01)
G06N 5/02 (2006.01)
(52) U.S. Cl. . 706/50; 706/59; 707/E17.05; 707/E17.108
(58) Field of Classification Search .............. 706/50
See application file for complete search history.

(56) References Cited

U.S. PATENT DOCUMENTS

| | | | | |
|---|---|---|---|---|
| 6,629,088 | B1 * | 9/2003 | Rising, III | 706/12 |
| 6,963,831 | B1 * | 11/2005 | Epstein | 704/9 |
| 6,963,931 | B2 * | 11/2005 | Bunn et al. | 709/246 |
| 6,983,239 | B1 * | 1/2006 | Epstein | 704/9 |
| 7,103,591 | B2 * | 9/2006 | Asobayire et al. | 1/1 |

OTHER PUBLICATIONS

Rong Zhou et al., "Combining Breadth-first and Depth-First Strategies in Searching for Treewidth," Proceedings of the 21$^{st}$ International Joint Conference on Artificial Intelligence, pp. 640-645, XP00260800, Jul. 17, 2009.
Alexander Reinfeld et al., "Enhanced Iterative-Deepening Search," EIII Transactions on Pattern Analysis and Machine Intelligence, vol. 16, No. 7, pp. 701-710, XP00260801, Jun. 30, 1994.
P. Alex Dow et al., "Best-First Search for Tree Width," Proceedings of the 22$^{nd}$ National Conference on Artificial Intelligence (AAAI-07), pp. 1146-1151, XP00260802, Dec. 31, 2007.
Rong Zhou et al., "Structured Duplicate Detection in External-Memory Graph Search," Proceedings of the 19$^{th}$ National Conference on Artificial Intelligence, pp. 683-688, XP00260803, Dec. 31, 2004.
Zhou et al., "Breadth-First Heuristic Search," Artificial Intelligence, Elsevier Science Publisher B.V., Amsterdam, NL LNKD—DOI:10. 1016/J. ARTINT.2005.12.002, vol. 170, No. 4-5, pp. 385-408, XP005303314, Apr. 1, 2006.
European Search Report for EP 10159602.1 dated Sep. 15, 2010.
S. Arnborg, "Complexity of finding embeddings in a k-tree," *SIAM Journal on Algebraic and Discrete Methods*, 8(2):277-287, 1987.
H. Bodlaender et al., "Contraction and treewidth lower bounds," In *Proc. of the 1th European Symposium on algorithms*, pp. 628-639, 2004.

(Continued)

*Primary Examiner* — Michael B Holmes
(74) *Attorney, Agent, or Firm* — Fay Sharpe LLP (57) ABSTRACT

A system and method to integrate breadth-first and depth-first strategies in a single search technique or routine is provided. It combines the complementary strengths of both strategies to achieve significantly improved speed over either strategy used alone. The new algorithm can be used to efficiently find solutions to the treewidth problem that has applications in areas such as diagnosis using probabilistic inferences.

15 Claims, 7 Drawing Sheets

OTHER PUBLICATIONS

H. Bodlaender et al., "On exact algorithms for treewidth," In *Proc. Of the 14th European Symposium on Algorithms*, pp. 672-683, 2006.

A. Darwiche, "Recursive conditioning," *Artificial Intelligence*, 126(1-2):5-41, 2001.

V. Gogate et al., "A complete anytime algorithm for treewidth," In *Proc. Of the 20th Conference on Uncertainty in Artificial Intelligence*, pp. 201-208, 2004.

Korf et a., "Frontier search," *Journal of the ACM*, 52(5):715-748, 2005.

Lauritzen et al., "Local computations with probabilities on graphical structures and their application to expert systems," *Journal of Royal Statistics Society, Series B*, 50(2):157-224, 1988.

R. Zhou et al., "Sweep A*: Space-efficient heuristic search in partially ordered graphs," In *Proc. Of 15th IEEE International Conf. On Tools with Artificial Intelligence*, pp. 427-434, 2003.

R. Zhou et al., "Breadth-first heuristic search," In *Proc. Of the 4th International Conference on Automated Planning and Scheduling*, pp. 92-100, 2004.

W. Ruml et al., "On-line Planning and Scheduling for High-speed Manufacturing," *American Association for Artificial Intelligence*, 10 pages, 2005.

Dechter, "Bucket elimination: A unifying framework for reasoning," *Artificial Intelligence*, 113(102):41-85, 1999.

* cited by examiner

| TW* | Dnode | FULL DECISION TREE | | Dnode | FULL DECISION TREE | |
|---|---|---|---|---|---|---|
| | | EXP | SEC | | EXP | SEC |
| 14 | 799K | 160K | 9.0 | 117K | 160K | 12.2 |
| 14 | 998K | 322K | 15.7 | 123K | 322K | 18.3 |
| 15 | 710K | 327K | 13.3 | 97K | 326K | 16.2 |
| 15 | 875K | 334K | 14.2 | 111K | 333K | 17.2 |
| 15 | 1,442K | 517K | 25.0 | 148K | 515K | 28.9 |
| 16 | 5,701K | 3,629K | 193.9 | 270K | 3,630K | 202.2 |
| 16 | 7,055K | 3,826K | 211.8 | 415K | 3,819K | 223.7 |
| 16 | 6,181K | 4,431K | 215.8 | 397K | 4,424K | 227.0 |
| 16 | 6,900K | 4,677K | 230.8 | 389K | 4,672K | 243.1 |
| 17 | 9,619K | 6,232K | 342.5 | 367K | 6,231K | 350.8 |

FIG. 4

| TW* | FULL DECISION TREE | | | | NEIGHBOR | | |
|---|---|---|---|---|---|---|---|
| | NODE | EXP | SEC | NODE | Dnode | EXP | SEC |
| 13 | 430,184 | 1,494,554 | 84.9 | 485,174 | 354,235 | 1,444,525 | 74.9 |
| 13 | 608,958 | 1,915,962 | 123.5 | 602,720 | 436,021 | 1,842,721 | 105.9 |
| 13 | 2,191,918 | 7,449,878 | 631.2 | 2,129,098 | 789,137 | 7,306,455 | 422.0 |
| 12 | 1,947,561 | 7,625,206 | 486.7 | 1,700,106 | 1,132,437 | 7,479,034 | 353.8 |
| 13 | 2,138,996 | 9,866,471 | 553.7 | 2,228,288 | 1,599,155 | 9,705,659 | 441.2 |
| 14 | 33,603,321 | 124,616,891 | 26,943.7 | 27,195,887 | 4,205,060 | 123,068,347 | 10,144.5 |
| 14 | 44,158,361 | 150,735,512 | 67,360.6 | 42,147,733 | 6,562,130 | 145,508,098 | 19,917.0 |
| 14 | 47,553,089 | 169,672,080 | 69,420.6 | 40,197,720 | 5,243,087 | 166,965,285 | 20,800.5 |
| 14 | 44,831,166 | 176,838,188 | 32,372.6 | 34,552,465 | 6,077,206 | 175,624,948 | 12,779.3 |
| 15 | 73,850,566 | 248,633,008 | 114,623.7 | 57,612,526 | 4,748,778 | 243,467,972 | 30,687.2 |

| GRAPH | Ub | Lb | Tw | STORED | EXP | SEC |
|---|---|---|---|---|---|---|
| queen5_5 | 18 | 12 | 18 | 961 | 1,294 | 0.1 |
| david | 13 | 10 | 13 | 483 | 2,009 | 0.4 |
| queen6_6 | 25 | 15 | 25 | 11,995 | 13,353 | 1.6 |
| miles500 | 22 | 21 | 22 | 2 | 2 | 2.3 |
| inithx.i.1 | 56 | 55 | 56 | 209 | 370 | 30.8 |
| queen7_7 | 35 | 18 | 35 | 597,237 | 935,392 | 149.6 |
| myciel5 | 19 | 14 | 19 | 678,540 | 3,418,309 | 192.3 |

SYSTEM AND METHOD FOR COMBINING BREADTH-FIRST AND DEPTH-FIRST SEARCH STRATEGIES WITH APPLICATIONS TO GRAPH-SEARCH PROBLEMS WITH LARGE ENCODING SIZES

BACKGROUND

Searching a graph of combinatorial possibilities is a general optimization technique used in various fields including artificial intelligence and operations research, among many others. There are many practical applications of these types of techniques to allow for improved performance in industry. Breadth-first search and depth-first searches are two basic search strategies upon which numerous search algorithms are built.

While the presently described embodiments disclosed in this application are not limited to a particular graph search problem, we use treewidth as a concrete example as a problem with a large encoding size and show how an embodiment of these presently described embodiments can be used to solve the treewidth problem more efficiently. To explain, by way of background, a treewidth (also known as the induced treewidth) measures how similar a graph is to a tree, which has a treewidth of 1. A graph of k vertices is least similar to a tree, if it is a completely connected graph, which has a treewidth of k−1. However, most graphs have a treewidth that is somewhere in between 1 and the number of vertices minus 1. To determine the treewidth of a graph, all vertices must be eliminated from the graph one after another until the graph is empty. When a vertex is eliminated, an edge is added to every pair of its neighbors that are not adjacent, and all the edges incident to the vertex are removed along with it. For each elimination order, the maximum degree (i.e., the number of neighbors) of any vertex when it is eliminated from graph is defined as the width of the elimination order. The treewidth of a graph is defined as the minimum width over all possible elimination orders, and an optimal elimination order is any order whose width is the same as the treewidth.

The treewidth of a graph plays a central role in determining the complexities of many algorithms based on graphical models. For example, the complexities of Bayesian-network algorithms such as Bucket Elimination, JoinTree, and Recursive Conditioning are all exponential in the treewidth of the underlying graph induced by the network. Thus, reducing the treewidth even by a small amount can result in huge computational savings for various probabilistic inferences over Bayesian networks.

Some previous work used depth-first search to find optimal treewidth by searching in the space of all possible vertex elimination orders. Depth-first search provides the advantage of excellent memory-reference locality and thus increased execution speed. On the other hand, depth-first search is most effective for problems with a tree structure, but unfortunately the treewidth problem, as well as many other important combinatorial problems, has a graph structure with many alternative paths between nodes in the search space. Although in theory it is always possible to "unroll" a search graph into a search tree, doing so often results in an exponential increase in the size of the search space and in practice depth-first search is often found to be unacceptably slow on a wide range of graph-search problems, due to the extraordinary number of duplicate search nodes that it has to deal with.

Recently, P. Alex Dow and Rich Korf, Best-first Search for Treewidth, *Proceedings of the 22d National Conference on Artificial Intelligence* (AAAI-07), pages 1146-1151 (2007) (hereinafter referred to as Dow and Korf [AAAI-07]), which is incorporated herein by reference in its entirety, have shown breadth-first and best-first search can dramatically outperform depth-first search by avoiding repeated generation of duplicate search nodes. The difficulty with a breadth/best-first search, however, is memory requirements, which tend to grow exponentially with the size of the graph. To compute the treewidth, each node in the search space represents an intermediate graph resulted from eliminating a subset of vertices from the original graph. Since the size of an intermediate graph can vary from several kilobytes to a few megabytes, storing the entire intermediate graph at each node is impractical for all but the smallest problem. To improve memory efficiency, Dow and Korf propose to store only the set of vertices that have been eliminated so far (as opposed to the intermediate graph) at each node. Every time a node is expanded, its corresponding intermediate graph is reconstructed by eliminating from the original graph those vertices stored with the node. Note that the original graph only needs to be stored once globally. While being space-efficient, this approach incurs the overhead of intermediate graph reconstruction every time a node is expanded. For large graphs, such overhead can be quite significant. This detracts from the advantages provided by breadth-first search.

BRIEF DESCRIPTION

In accordance with one aspect of the presently described embodiments, a graph search method comprising generating an ordered decision tree structure to represent the set of search frontier nodes with internal nodes of the decision tree corresponding to decision nodes operative to perform tests on state variables, and the leaf nodes corresponding to nodes in a search frontier, performing depth-first traversal in the ordered decision tree structure to order node expansions such that a node to be expanded next is a close neighbor of a current node and deriving an intermediate graph of the selected node by modifying the intermediate graph of the current node.

In accordance with another aspect of the presently described embodiments, the generating and deriving comprise a breadth-first approach.

In accordance with another aspect of the presently described embodiments, the generating and deriving comprise a best-first approach.

In accordance with another aspect of the presently described embodiments, the method further comprises deriving encoding or representation of a node that is needed to generate successors of the node In accordance with another aspect of the presently described embodiments, modifying the intermediate graph comprises performing actions and meta-actions.

In accordance with another aspect of the presently described embodiments, the actions include eliminating vertices.

In accordance with another aspect of the presently described embodiments, the meta-actions include un-eliminating vertices.

In accordance with another aspect of the presently described embodiments, the undo information for an edge of the meta search space is cached until the depth-first traversal in the order decision tree structure backtracks from the edge to the source decision node of that edge.

In accordance with another aspect of the presently described embodiments, each internal decision node stores a counter for a number of leaf nodes in the decision tree, and any internal node having a counter with a value of zero is deleted.

In accordance with another aspect of the presently described embodiments, the order in which the state variables are tested in the decision tree structure is arranged in decreasing order of the number of neighbors a vertex has in the graph.

In accordance with another aspect of the presently described embodiments, the internal nodes of the ordered decision tree structure are selectively generated and deleted by constructing a decision tree for a subset of the frontier nodes.

In accordance with another aspect of the presently described embodiments, an approach based on state-space abstraction is used to determine the frontier nodes that belong to a same subset for which the decision tree structure is constructed and an order in which nodes in different subsets are expanded.

In accordance with another aspect of the presently described embodiments, a system comprises sensors operative to detect states or events or conditions within the system, a controller operative to control the system or a process of the system based on output of the sensors and a diagnosis module within the controller to diagnose the system or process of the system, the diagnosis module having a treewidth solver being operative to generate an elimination order of the diagnosis variables that corresponds to the minimum width of an underlying Bayesian network, the treewidth solver using an ordered decision tree structure to represent the set of search frontier nodes with internal nodes of the decision tree corresponding to decision nodes operative to perform tests on state variables, and the leaf nodes corresponding to nodes in a search frontier, perform depth-first traversal in the ordered decision tree structure to order node expansions such that a node to be expanded next is a close neighbor of a current node and derive an intermediate graph of the selected node by modifying the intermediate graph of the current node.

In accordance with another aspect of the presently described embodiments, the diagnosis comprises diagnosis, prognosis and analysis of state of health of the system.

In accordance with another aspect of the presently described embodiments, the system is an image rendering system.

BRIEF DESCRIPTION OF THE DRAWINGS

FIG. 2(*a*) is an illustration of a symbolic tree structure according to the presently described embodiments;

FIG. 2(*b*) is an illustration of a symbolic tree structure according to the presently described embodiments;

DETAILED DESCRIPTION

As noted above, breadth-first search and depth-first search are two basic search strategies upon which numerous search algorithms are built. These techniques have fundamental differences in ordering node expansions. Nonetheless, according to the presently described embodiments, there are many applications that can benefit from integrating the two strategies in a single search algorithm. For example, techniques according to the presently described embodiments can be used in Bayesian networks to solve diagnosis problems in production systems or, as a further example, image rendering (e.g. printing and/or copying) systems.

The presently described embodiments describe a new way to integrate breadth-first and depth-first strategies in a single search technique or routine that combines the complementary strengths of both strategies to achieve significantly improved speed over either strategy used alone.

Figure 1:
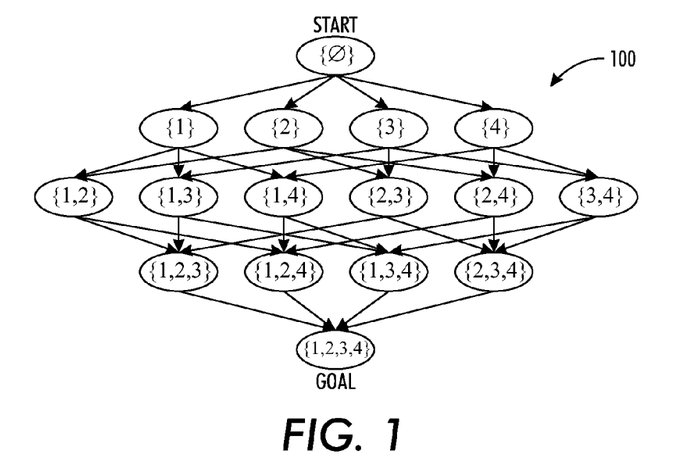
FIG. 1 is an illustration of a search graph.

Referring now to FIG. 1, the search space 100 of optimal treewidth for a graph of 4 vertices is shown. Each oval represents a search node identified by the set of vertices eliminated so far for that node. The start node corresponds to the original graph with an empty set of eliminated vertices and the goal node is the one with all the vertices eliminated.

Instead of working from an original graph (as in Dow and Korf's best-first or breadth-first search techniques) to derive an intermediate graph, the presently described embodiments derive an intermediate graph from the subject node's closest neighbor that has much similarity (but less overhead) to the original graph. While a simplest way to find a node's closest neighbor is to compute the shortest paths from the node to all of its neighbors and pick the one with the minimum distance, this is not always applicable to the treewidth problem, whose state space is a partially ordered graph in which the distance between any pair of nodes at the same depth is always infinite. For example, suppose there are two nodes that correspond to the intermediate graphs resulted from eliminating vertices {1,2,3} and {1,2,4} from the original graph, respectively. From FIG. 1, it can be seen that there is no legal path between these two nodes, because once a vertex is eliminated, it cannot be "uneliminated."

The approach according to the presently described embodiments is to measure the distance between a pair of nodes in a meta search space instead of the original search space. A meta search space has exactly the same set of states as in the original search space, but is augmented with a set of meta actions that can transform one node into another in ways not allowed in the original search space. For example, a meta action for the treewidth problem is an action that "uneliminates" a vertex by reversing the changes made to a graph when the vertex was eliminated. For the treewidth problem augmented with the "uneliminate" meta action, its search graph is an undirected version of the graph shown in FIG. 1. In this new graph, called meta search graph, actions (i.e., edges) can go back and forth between a pair of nodes, and this allows us to generate the intermediate graph of a node from another node at the same depth, which is very useful for breadth-first heuristic search, the most memory-efficient graph-search algorithm for this problem, such as Dow & Korf [AAAI-07] and many others such as R. Zhou and E. Hansen, Breadth-first heuristic search, *Artificial Intelligence*, 170 (4-5):385-408 (2006) (hereinafter referred to as Zhou & Hansen [AIJ-06]), which is incorporated herein by reference in its entirety.

Since a node is uniquely identified by the set of vertices eliminated, the same lower-case letter (e.g., n, u, and v) denotes both "a node" and "a set of eliminated vertices" herein. To implement the "uneliminate" meta action, each edge of the meta search graph is labeled by a tuple $\langle u, v, \Delta E^+, \Delta E^- \rangle$ where u (v) is the set of vertices eliminated so far at the source (destination) node of the edge, and $\Delta E^+$ ($\Delta E^-$) is the set of edges added to (deleted from) the graph when the singleton vertex set $x=v \setminus u$ is eliminated. Let $G_n = \langle V_n, E_n \rangle$, be the intermediate graph associated with node n. The task of adding a previously-eliminated vertex back to the graph can be expressed formally as: given $G_v = \langle V_v, E_v \rangle$, and $e = \langle u, v, \Delta E^+, \Delta E^- \rangle$, how to compute $G_u = \langle V_u, E_u \rangle$. Since all the changes are recorded with the edge, one can reconstruct $G_u$ as $\langle V_u = V_v \cup v \setminus u, E_u = E_v \cup \Delta E^- \setminus \Delta E^+ \rangle$. That is, by adding (deleting) the edges that have been previously deleted (added) to the graph, the "uneliminate" meta action can undo the effects of an elimination action in the original search space.

In general, adding meta actions can turn directed graphs into undirected graphs such that the effects of any actions in the original search space can be "undone." This guarantees that any changes made to the current state of the world (e.g., the intermediate graph) is always reversible, creating a graph with the following appealing property: for any two states that are reachable from the start state, there is always a path in the graph that connects them. If actions have deterministic effects, then a state x is uniquely identified by another state y plus a path from y to x, assuming a path exists between y and x (which is always true for undirected graphs). For the tree-width problem, this means the intermediate graph of a node can be generated from any node instead of only from the node's direct ancestors such as the start node. Thus, one only needs to maintain a single intermediate graph, which can be modified to become the intermediate graph for any node in the search space. Although in the worst case it is possible that this may take more work than eliminating from the original graph, such pathological cases happen so rarely that they do not contribute significantly to the overall running time. This is also confirmed by the experiments. An interesting question is how to minimize the overhead of generating the intermediate graph from one node to another. The answer depends on the search strategy, because ultimately our goal is to minimize the overhead of expanding not just a single node but a set of nodes.

Figure 2A:
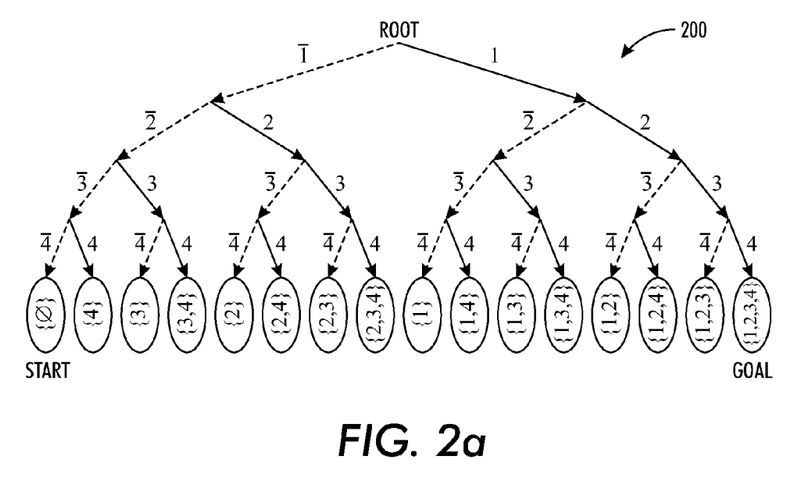

Referring now to FIG. 2(a), an example binary decision tree 200 with search nodes for treewidth as leaves is shown. The solution proposed here is to use an ordered decision tree to store the set of frontier nodes at the current depth of breadth-first search as the leaves of the decision tree. Unlike explicit-state search methods, this approach can be viewed as a variant of symbolic search in which the similarities among a set of nodes are retained and exploited by the search algorithm. A decision tree is defined as a rooted tree in which every non-leaf node is a decision node that performs a test on a variable, the value of which is then used to determine recursively the next decision node until a leaf node is reached. A decision tree is commonly used to represent a discrete function over a set of variables. For the treewidth problem, the set of variables are Boolean variables, one for each vertex. A truth assignment to a Boolean variable indicates the corresponding vertex has been eliminated. Thus, we only need to focus on binary decision trees here, even though multi-valued decision trees might be needed for the general case. To make operations on decision trees more efficient, an ordering constraint is usually enforced that requires the order in which variables are tested be the same on any path from the root to a leaf node.

The resulting data structure is called an ordered binary decision tree, an example of which is shown in FIG. 2(a). In this example, variables are tested in increasing order of vertex id 1, 2, 3, and 4. A solid (dashed) edge represents a truth (false) assignment to the variable being tested at the source node of the edge. A leaf node corresponds to a complete assignment to all the variables, and there is a one-to-one mapping from the set of leaf nodes shown in FIG. 2(a) to the set of search nodes shown in FIG. 1.

Figure 2B:
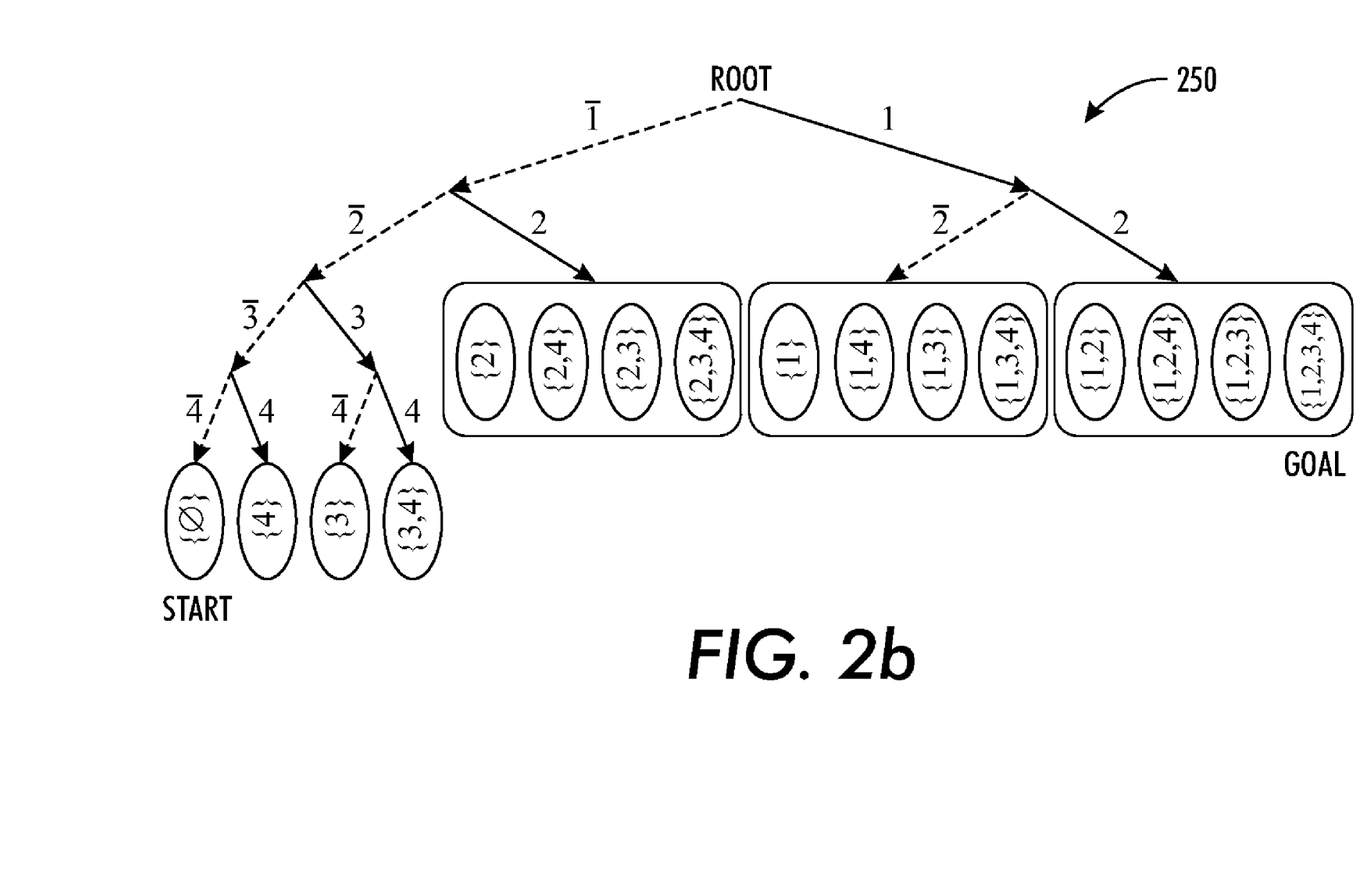

With reference now to FIG. 2(b), a partial binary tree structure 250 is shown. In this partial binary tree structure, currently expanding nodes are stored as full depth leaves and non-expanding nodes as shallow-depth leaves. An advantage to such a tree structure is the reduction of space overhead. The idea is to generate the decision nodes of the tree on the fly as the leaf nodes get expanded. So, only a subset of frontier nodes that are selected for expansion need to represented in decision tree form.

In this partial decision tree structure 250, two types of leaves are used. The first type is a full-depth leaf, which is uniquely identified by a complete path whose length equals the number of vertices in the original graph. The second type of leaf is a shallow depth leaf which is identified by an incomplete path. As shown, only currently expanding leaves are represented a full-depth leaves in the tree structure 250. Also, because an incomplete path can lead to a set of shallow-depth leaves, a bit vector is stored at each frontier node to specify its "remaining" path.

It should be appreciated that a search strategy should conform to the partial decision tree structure. In one form, a technique called structured duplicate detection (SDD), R. Zhou and E. Hansen, Structured duplicate detection in external memory graph search, *Proceeding of the $19^{th}$ National Conference on Artificial Intelligence* (AAAI-04), pages 683-688 (2004), which is incorporated herein by reference in its entirety, is advantageously used. Using this SDD technique nodes are partitioned into buckets, for each abstract state defined by a state-space projection function. To exploit locality, SDD expands nodes in the same bucket consecutively. In the case of partial decision trees, SDD expands full-depth leaves first. Upon selecting a new bucket for expansion, SDD converts all shallow-depth leaves into full-depth leaves before expanding them. As such, the search technique has the illusion of working on a full tree structure.

The purpose of using an ordered binary decision tree, such as the decision tree structures illustrated in FIGS. 2(a) and 2(b), to store the set of frontier nodes is twofold. First, it reveals the similarities among these frontier nodes, because nodes with the same prefix (according to the test ordering) share the same ancestor node in the decision tree. For example, because nodes {1,2,3} and {1,2,3,4} share the same prefix {1,2,3}, they have the same parent node in the decision tree. On the other hand, because nodes {∅} and {1,2,3,4} have nothing in common, their common ancestor is only the root node. Second, the tree topology guarantees there is a unique path from the root to a leaf node. This facilitates the use of a tree-search algorithm like depth-first search in the decision tree to determine the order in which frontier nodes are expanded. Depth-first search is well-known for its excellent memory-reference locality, which is particularly well suited for decision trees, since a depth-first search of a decision tree always visits nodes with the same prefix before visiting nodes with different prefixes, and the longer the prefix is shared by two nodes, the closer they will be visited in depth-first search. For the treewidth problem, this means if two nodes have similar intermediate graphs, they will be expanded close to each other, and the more similar their intermediate graphs are, the closer they will get expanded. Since depth-first traversal explores all leaf nodes in the decision tree, it also tends to minimize the intermediate-graph generation overhead for the entire set of frontier nodes in the search graph. Thus, the presently described embodiments adopt a hybrid search strategy that uses depth-first traversal in a symbolic (e.g., a decision-tree) representation of the (meta) search graph to determine the order of node expansions for the current depth of breadth-first search. The depth-first search aspect essentially serves as a tie-breaking strategy in breadth-first search to improve its memory-reference locality, and, in the case of treewidth computation, it also reduces the overhead of generating the intermediate graphs.

Figure 3:
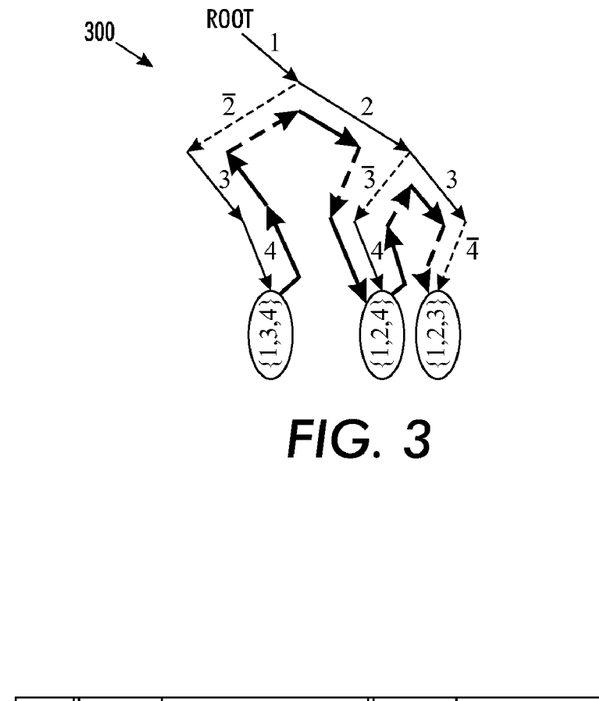
FIG. 3 is a portion of the symbolic tree structure of FIGS. 2(*a*) or 2(*b*)

FIG. 3 shows how a depth-first search in a binary decision tree can be used to order node expansions in breadth-first treewidth computation. It shows an example how depth-first search can reduce the intermediate-graph generation overhead in breadth-first search for treewidth. Suppose the three leaves shown in FIG. 3 are the frontier nodes of breadth-first heuristic search, and the intermediate graph has already been generated for node {1,3,4}. Depth-first search will visit node {1,2,4} next, and then node {1,2,3}. A sequence of dark (solid and dashed) arrows represent the order in which actions are taken in order to migrate the intermediate graph from node {1,3,4} to node {1,2,4} and then to node {1,2,3}. A solid dark arrow moving towards the leaf (root) represents an action that eliminates (uneliminates) a vertex. Dashed arrows represent no-op actions that simply move an intermediate graph around in the decision tree without changing its content. The action sequence shown in FIG. 3 starts with a meta action (shown as a dark, upward arrow from node {1,3,4}) that "uneliminates" vertex 4 from the intermediate graph G{1,3, 4} in order to generate G{1,3}. Then vertex 3 is "uneliminated" to generate G{1}. Next, vertex 2 is eliminated from the intermediate graph to generate G{1,2}, and then vertex 4 is eliminated to arrive at G{1,2,4}. To migrate from node {1,2,4} to node {1,2,3}, vertex 4 is "uneliminated" and then vertex 3 is eliminated to generate the intermediate graph G{1,2,3}. Because an "uneliminate" meta action does not need to check for connectivity between all possible pairs of a vertex's neighbors, it is usually much cheaper than eliminating a vertex. Thus, we only count the number of times an elimination action is performed as overhead.

In this example, there are only 3 elimination actions. For comparison, generating the intermediate graphs for nodes {1,2,3} and {1,2,4} from the root node would require 6 elimination actions (3 for node {1,2,3} and 3 for node {1,2,4}), which are (almost) twice as expensive. Note that the benefit of the approach of the presently described embodiments increases as frontier nodes move further away from the root. For example, if the three leaf nodes in FIG. 3 are a hundred elimination steps away from the root node, then it will take about 200 elimination actions to regenerate the intermediate graphs; whereas it still takes the same number of elimination actions (3) in the case of the presently described embodiments, no matter how deep the nodes. Note that elimination actions can have significantly different overhead, which depends on the size and topology of the intermediate graph. Since intermediate graphs have fewer vertices at deeper search depths, elimination actions tend to become cheaper as search nodes move further away from the root. In other words, the overhead of the 3 actions needed in the present approach is probably cheaper than 1.5% (i.e., 3/200) of the overhead incurred by generating the intermediate graphs from the root, if one takes into account the overhead differences in elimination actions.

Since a decision tree is used as the underlying data structure for storing the search frontier nodes, the memory requirements depend on not only how many frontier nodes are stored but also the number of non-leaf decision nodes. To improve memory efficiency, in one form, a decision node is removed if it does not lead to any frontier nodes. To do so, a leaf-node counter is stored at each decision node in the tree. Each time a leaf node is deleted, all of its ancestor decision nodes decrease their leaf-node counters by one, and a decision node is deleted as soon as its leaf-node counter reaches zero. It can be shown that with this pruning rule in place, the space complexity of the decision tree is $O(|V||N|)$, where $|V|$ is the number of vertices in the original graph and $|N|$ is the number of frontier nodes stored. Given that the space complexity of an explicit-state (as opposed to symbolic) representation is also $O(|V||N|)$, it turns out that our decision-tree approach does not increase the space complexity of the search algorithm, even though it stores additional information such as common prefixes in the tree.

Another way to improve memory efficiency is to find a good ordering of the variables, which also affects the number of decision nodes needed to represent a set of frontier nodes. While finding an optimal ordering is a hard combinatorial optimization problem in itself, good ones can often be found quickly by using simple heuristics. Three variable-ordering heuristics were implemented and tested. The random ordering heuristic orders the variables randomly. The minimum-degree-vertex-first heuristic orders the variables in increasing degrees of their corresponding vertices, and maximum-degree-vertex-first heuristic does the opposite. According to the experiments, the random ordering and minimum-degree-vertex-first heuristics store on average 40% and 135% more decision nodes than the maximum-degree-vertex-first heuristic in solving randomly generated treewidth instances, respectively. Thus, the latter was used to produce all the experimental results reported next.

Next we introduce two different strategies for caching the "undo" information at the edges of the frontier decision tree. The cache-until-removal strategy stores undo information for every edge of the decision tree until the edge is removed due to the pruning of some decision node. The cache-until-backtrack strategy stores undo information until the depth-first traversal of the decision tree backtracks from the edge to the source decision node of that edge. In other words, it only stores undo information along the current "call stack" of the depth-first traversal. Thus, the maximum number of edges for which undo information is stored cannot exceed the depth of the decision tree, which is bounded by the number of vertices in the original graph. Because the memory requirements depend on the complexity of the undo information measured in terms of the size of $\Delta E+$ and $\Delta E-$, our implementation keeps track of the maximum number of edges included in all such $\Delta E$ sets, which reflects accurately the total amount of memory used for storing undo information over the entire decision tree. With the cache-until-removal strategy, the average peak number of $\Delta E$ edges cached is 7,253,520 edges. This number decreased to about 405 edges when the cache-until-backtrack strategy was used, reducing the number of $\Delta E$ edges by a factor of over 17,900 times! Surprisingly, this has little effect on the average running time of the algorithm; using the cache-until-backtrack strategy increased the average running time by less than 1.7%, which is hardly noticeable. Results presented next were obtained by using the cache-until-backtrack strategy only.

Figure 4:
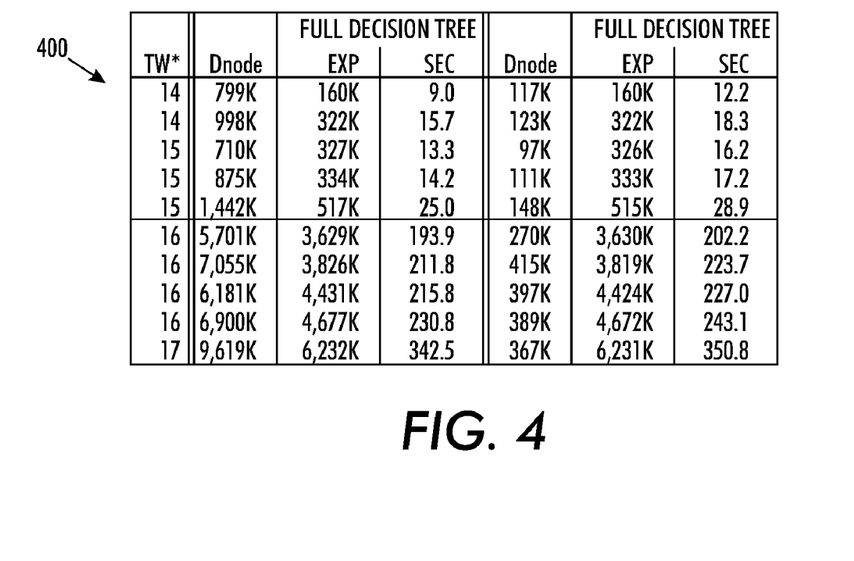
FIG. 4 is a table showing a comparison of full and partial frontier decision trees.

In this regard, table 400 of FIG. 4 shows a comparison of full and partial frontier decision nodes. Columns show the treewidth (Tw), peak number of decision nodes stored in thousands (Dnode), number of nodes expanded in thousands (Exp), and running time in CPU seconds (Sec). The horizontal line separates the five easiest from the five most difficult graphs from a set of one hundred random graphs. As shown, there is a reduction in the peak number of decision nodes stored in a partial tree against a full tree. A set of one hundred graphs were generated using V=35 and E=140. There is more reduction in the peak number of decision nodes as problem difficulty increases. Further reduction will occur with application of SDD if finer-grained state-space projection functions are used to partition the search frontier nodes into smaller buckets.

Figure 5:
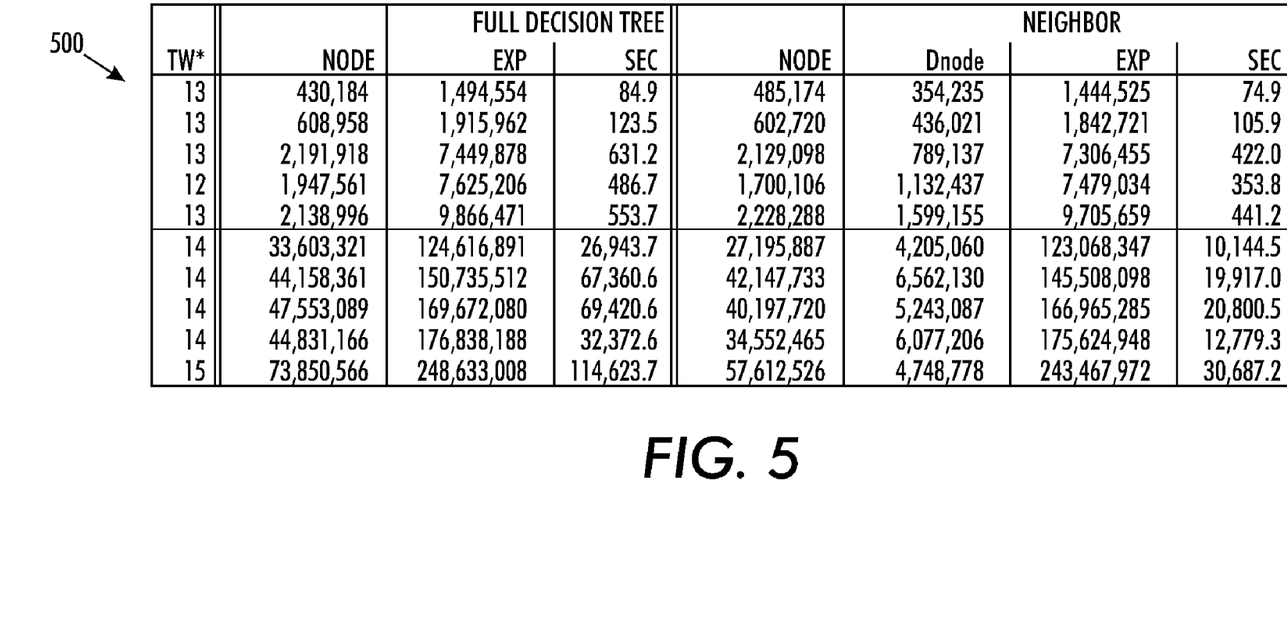
FIG. 5 is a table showing a comparison of different approaches to generating intermediate graphs.

FIG. 5 shows the comparison of two different approaches to generating the intermediate graphs (e.g. having V=40 and E=120) in table 500, one by eliminating vertices from the original graph and the other by modifying the intermediate graph of a neighboring node. In table 500, the column labeled "Start node" corresponds to the approach of generating the intermediate graph by eliminating vertices from the original graph. The column labeled "Neighbor" corresponds to the approach of modifying the intermediate graph of a neighboring node. Both approaches use BFHS as their underlying search algorithm. It's interesting to see that the ratio by which the second approach improves upon the first one increases with the hardness of the instance. For example, the average speedup ratio for the 5 easiest instances (shown above the horizontal line) is 1.3, which increases to 3.1 for the 5 hardest instances (shown below the horizontal line). The reason our approach performs increasingly better on hard instances is that the more nodes are expanded, the easier it is to find a neighbor whose intermediate graph closely resembles the one to be generated next.

Figure 6:
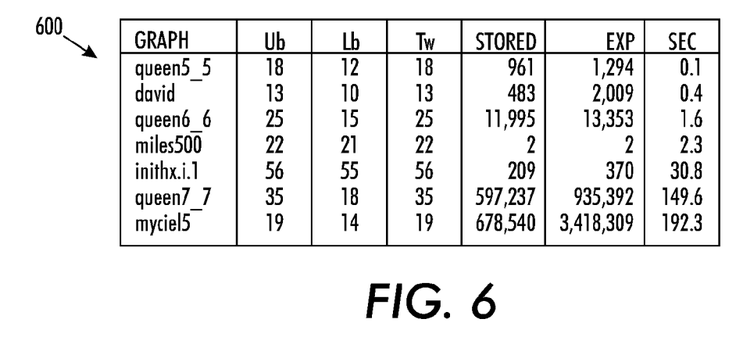
FIG. 6 is a table showing performance of a breadth-first heuristic search on benchmark graphs.

With reference now to FIG. 6, a table 600 is shown. The table shows performance of breadth-first heuristic searches on benchmark graphs (DIMACS graph coloring instances). Columns shown include the upper bound found by a divide and conquer method (Ub), the heuristic value for the start node (Lb), the treewidth (Tw), the peak number of frontier nodes stored (Stored), the number of node expansions (Exp), and running time in CPU seconds (Sec). The results show improvement over the state of the art.

In at least one type of planning and scheduling, one of the biggest performance bottlenecks is the copying of STNs (Simple Temporal Networks), which happens every time a node is generated. However, using the techniques described here, no copying of STNs would be necessary during a search episode, because STNs for different search nodes can be generated from modifying a globally-stored STN and only the difference part needs to be stored at the nodes along the current search path. While this can be easily done for depth-first search, doing so for best-first A* search, which is the search algorithm currently used by the sheet planner, is not so obvious, considering the difficulties in combining best-first with depth-first search. But according to the presently described embodiments, this is no longer a technical barrier. For domains with tight real-time requirements, such as the package-machine domains, for example, having fast operations on STNs can be valuable.

While much of the technical content provided here is for the treewidth problem, it should be clear that the presently described embodiments are not limited to the treewidth problem, which is used as a computational example. The presently described embodiments use a combination of breadth-first and depth-first search that allows a single search algorithm to possess the complementary strengths of both. As long as the similarities among different search nodes can be captured in some form that allows depth-first search to exploit the state-representation locality, the techniques described here will be effective, especially for graph-search problems with large encoding sizes.

There are a number of variations of the presently described embodiments. For example, instead of using a binary decision tree, one can use an n-ary decision tree for variables that can take more than two values. One can also order the variables differently than the three ordering heuristics described in the current embodiment. Moreover, one can use data structures other than decision trees to represent the similarities among a set of nodes. One possibility would be to use binary or algebraic decision diagrams, which are more succinct than decision trees.

The presently described embodiments have a number of practical applications that take advantage of the improved search techniques realized thereby. For example, one can use the improved treewidth solver to find optimal or near-optimal treewidth (using a beam-search variant of the current embodiment) and its corresponding vertex elimination order, which can be used in Bayesian network inference algorithms such as bucket elimination to reduce the computational complexity, which is exponential in treewidth. Applications of Bayesian networks include diagnosis, prognosis, and system health management, among other probabilistic inference frameworks. The treewidth also plays an important role in constraint satisfaction problems. For example, graph coloring problems can be readily solved once the treewidth is determined.

Figure 7:
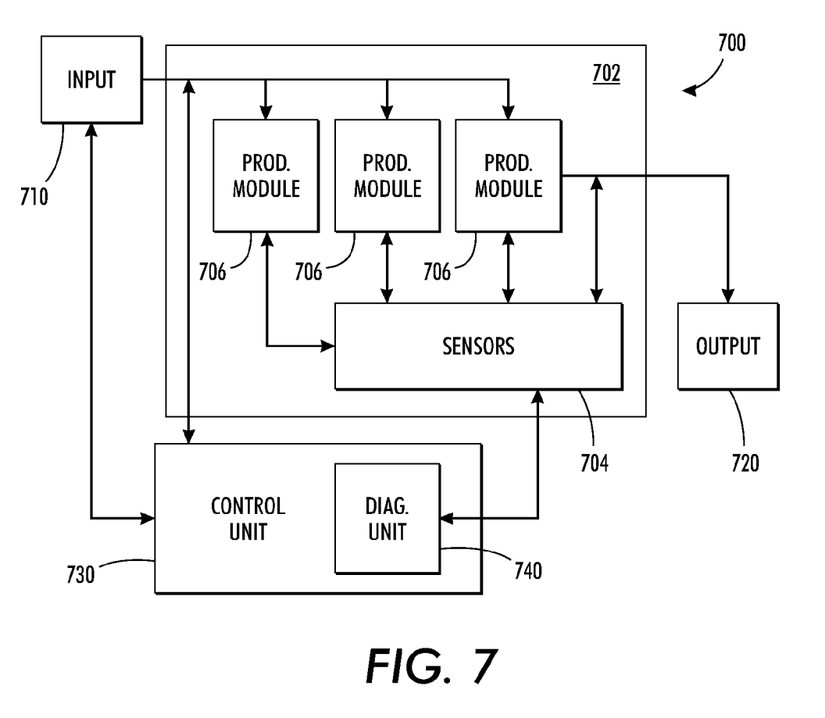
FIG. 7 is a system incorporating the presently described embodiments.

As but a mere example of the application and/or environment of the presently described embodiments, reference is made to FIG. 7. As shown, a system 700 (such as a production or processing system), includes a production or processing unit 702 having therein (among other components not shown for ease of reference) a series of sensors 704 and a production modules 706. It should be appreciated that the sensors 704 and the production modules 706 will vary as a function of the actual production process to which the presently described embodiments are applied; however, generally, the sensors 704 detect events or states within the production modules 706 or the output 720 for purposes of diagnosis of the system. Also shown are an input 710 and output 720. Of course, the input and output will vary by application. In some cases, the input could be raw material or components or information and the output could be a final product or a component or further information to be applied in a subsequent process.

Notably, the system 700 has a control unit 730 including a diagnostic unit 740. It will be appreciated that, in at least one form, the presently described embodiments are implemented in the diagnostics unit or module 740 by way of any of a variety of software techniques and/or hardware configurations to suit the application. For example, the implementation may include the use of microprocessors, embedded processors or other processing devices with suitable memory capabilities and processing speed. In this regard, the requirements may vary as a function of whether optimal or near optimal treewidth is desired for a particular application. In operation, the sensors 704 detect events or states or conditions within the production modules 706 or the output 720 and feed such information to the diagnosis module 740, which gives the most probable explanation for an observed symptom of the machine, as will be defined by the application. The control unit 730 can then use the diagnosis to perform other functions, including modifying the process, etc.

Figure 10:
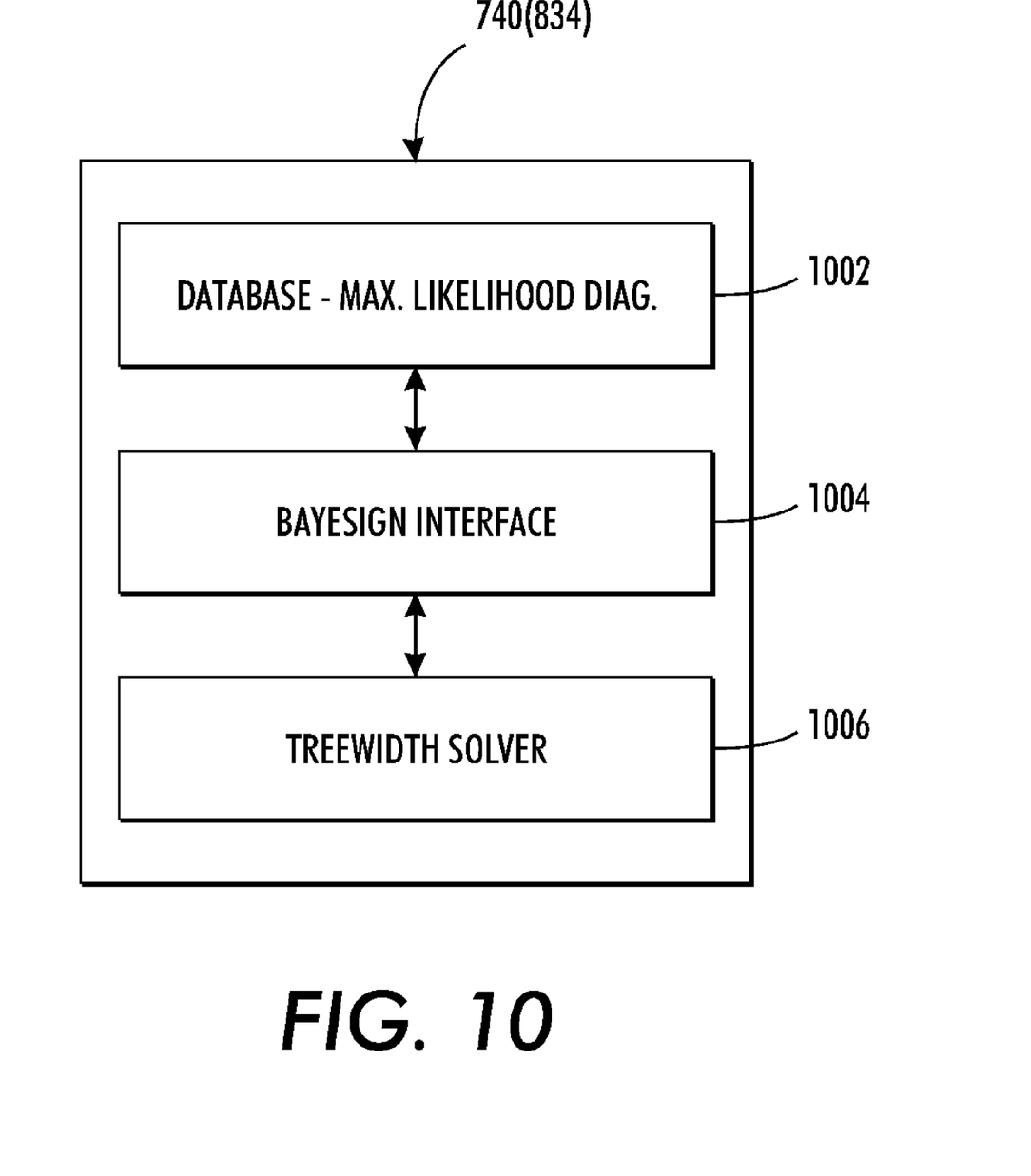

In one form, with reference to FIG. 10, the treewidth solver 1006 of the presently described embodiments may be used to improve the Bayesian inference (of Bayesian Inference Module 1004) in a diagnosis engine (such as diagnosis unit or module 740, or diagnosis module 834 as will be described hereafter) that uses Bayesian networks as underlying models of, for example, the production modules. Because the solver can find optimal treewidth better than any other optimal treewidth solver, this allows any Bayesian inference module 1004 whose complexity is exponential in the treewidth to run as efficiently as possible. In this regard, in at least one form, the role of the treewidth solver 1006 is to provide "advice" or input to the Bayesian Inference module 1004 in the form of an optimal vertex elimination order (as a byproduct of finding the optimal treewidth). In one form, a diagnosis database 1002 is also used that stores information such as maximum likelihood diagnosis given a Bayesian model of the production or process and past observations, and can be used to track the health state of the system or process or machine, schedule preventive maintenance, and recommend diagnosis probes and cost-effective fixes.

To achieve such functionality, in at least one form, in line with the presently described embodiments as described in connection with, for example, FIGS. 1-3, the diagnosis engine's treewidth solver is operative to generate an elimination order of the diagnosis variables that corresponds to the minimum width of an underlying Bayesian network. To accomplish this objective, the treewidth solver is operative to generate an ordered decision tree structure to represent the set of search frontier nodes with internal nodes of the decision tree corresponding to decision nodes operative to perform tests on diagnosis state variables, and the leaf nodes corresponding to nodes in a search frontier, perform depth-first traversal in the ordered decision tree structure to order node expansions such that a node to be expanded next is a close neighbor of a current node and derive an intermediate graph of the selected node by modifying the intermediate graph of the current node. Other functionality described above is also performed by the treewidth solver of the diagnosis engine.

Figure 8:
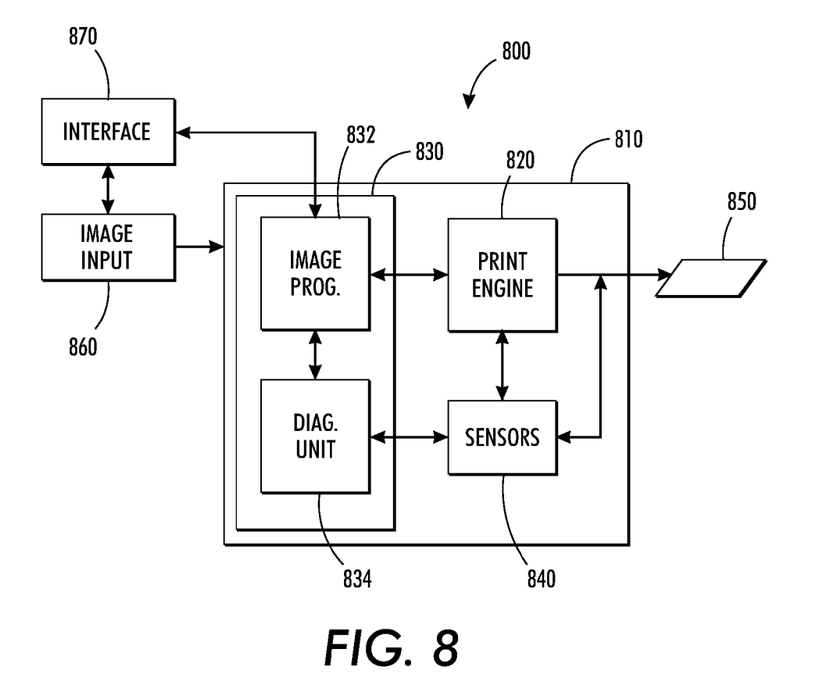
FIG. 8 is an example system incorporating the presently described embodiments.

Another example of a suitable environment for the presently described environment is shown in FIG. 8. As shown, an image rendering system 800 (such as a printer, copier, etc) includes (among other components not specifically shown for ease of reference) a rendering unit 810. The unit 810 has a print engine 820 (which could be a xerographic print engine or other suitable print engine), a control module or print controller 830 and sensors 840. The control module 830, in one form, includes an image processor 832 (which could take a variety of suitable forms) and a diagnosis module 834. Notably, the diagnosis module, in at least one form such as the form shown in connection with FIG. 10, is an implementation of the presently described embodiments by way of any of a variety of software techniques and/or hardware configurations to suit the contemplated rendering environments. For example, as noted above, the implementation may include the use of microprocessors, embedded processors or other processing devices with suitable memory capabilities and processing speed. In this regard, the requirements may vary as a function of whether optimal or near optimal treewidth is desired for a particular application.

Also shown are an output 850 (which could take a variety of forms including a sheet of paper), an image input module 860 (which could take a variety of forms including a sheet feeder for paper or a module to convey a digital image to the rendering unit 810) and an interface 870 (which could take a variety of forms including an interface resident on the rendering unit 810 or a remote interface running, for example, on a user's terminal).

Similar to the above, in operation, the sensors 840 detect events or states or conditions (e.g. symptoms) within the print engine 820 or the output 850 and feed such information to the diagnosis module 834, which gives the most probable explanation for an observed symptom of the machine, as will be defined by the application. In this environment, the observed symptom could take a variety of forms including, but not limited to, toner levels, color variations, color uniformity, alignment, registration, resolution, edge detection, etc. The control unit 830 can then use the diagnosis to perform other functions, including modifying the printing process, etc.

Figure 9:
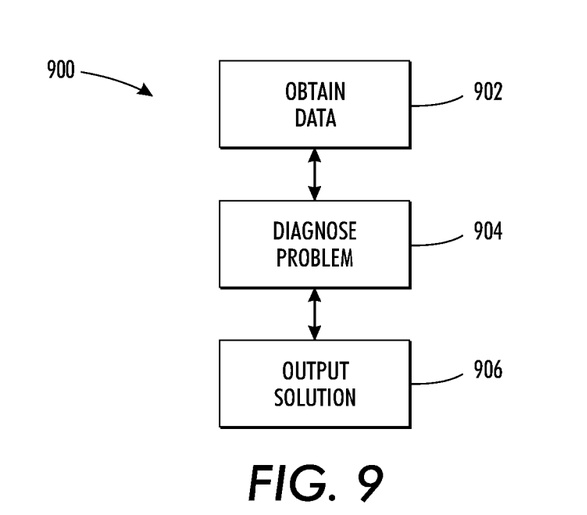
FIG. 9 is an example method according to the presently described embodiments; and, FIG. 10 is a block diagram of an example of a component of a system according to the presently described embodiments.

As will be apparent from the description of the example applications of FIG. 7 and 8, the presently described embodiments can be implemented to achieve an overall diagnosis (or other type of) method that has various implementations. As shown in FIG. 9, an example 900 of such an overall diagnosis method is illustrated. In this regard, the system or process typically will allow for the obtaining of data (such as sensor data) (at 902). Next, any problems are diagnosed by the presently described embodiments based on the data obtained (at 904). The process for such diagnosis is described in detail above in connection with FIGS. 1-8 and 10. In this regard, in at least one form, a treewidth solver is implemented to provide an improved utilization of Bayesian network analysis. In at least one form, the diagnosis engine's treewidth solver includes generating an ordered decision tree structure to represent the set of search frontier nodes with internal nodes of the decision tree corresponding to decision nodes operative to perform tests on state variables, and the leaf nodes corresponding to nodes in a search frontier, performing depth-first traversal in the ordered decision tree structure to order node expansions such that a node to be expanded next is a close neighbor of a current node and deriving an intermediate graph of the selected node by modifying the intermediate graph of the current node. Last, the solution to any detected problem is output by the system (at 906). The diagnosis output is based on probabilitic inferences which use an elimination order that corresponds to the optimal treewidth of the Bayesian network, as computed by the treewidth solver.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A graph search method comprising:
   generating an ordered decision tree structure to represent the set of search frontier nodes with internal nodes of the decision tree corresponding to decision nodes operative to perform tests on state variables, and the leaf nodes corresponding to nodes in a search frontier;
   performing depth-first traversal in the ordered decision tree structure to order node expansions such that a node to be expanded next is a close neighbor of a current node; and,
   deriving an intermediate graph of the selected node by modifying the intermediate graph of the current node.

2. The method as set forth in claim 1 wherein the generating and deriving comprise a breadth-first approach.

3. The method as set forth in claim 1 wherein the generating and deriving comprise a best-first approach.

4. The method as set forth in claim 1 further comprising deriving encoding or representation of a node that is needed to generate successors of the node.

5. The method as set forth in claim 1 wherein modifying the intermediate graph comprises performing actions and meta-actions.

6. The method as set forth in claim 5 wherein the actions include eliminating vertices.

7. The method as set forth in claim 5 wherein the meta-actions include un-eliminating vertices.

8. The method as set forth in claim 5 wherein the undo information for an edge of the meta search space is cached until the depth-first traversal in the ordered decision tree structure backtracks from the edge to the source decision node of that edge.

9. The method as set forth in claim 1 wherein each internal decision node stores a counter for a number of leaf nodes in the decision tree, and any internal node having a counter with a value of zero is deleted.

10. The method as set forth in claim 1 wherein the order in which the state variables are tested in the decision tree structure is arranged in decreasing order of the number of neighbors a vertex has in the graph.

11. The method as set forth in claim 1 wherein the internal nodes of the ordered decision tree structure are selectively generated and deleted by constructing a decision tree for a subset of the frontier nodes.

12. The method as set forth in claim 11 wherein an approach based on state-space abstraction is used to determine the frontier nodes that belong to a same subset for which the decision tree structure is constructed and an order in which nodes in different subsets are expanded.

13. A system comprising:
sensors operative to detect states or events or conditions within the system;
a controller operative to control the system or a process of the system based on output of the sensors; and,
a diagnosis module within the controller to diagnose the system or process of the system, the diagnosis module having a treewidth solver being operative to generate an elimination order of the diagnosis state variables that corresponds to the minimum width of an underlying Bayesian network, the treewidth solver using an ordered decision tree structure to represent the set of search frontier nodes with internal nodes of the decision tree corresponding to decision nodes operative to perform tests on state variables, and the leaf nodes corresponding to nodes in a search frontier, perform depth-first traversal in the ordered decision tree structure to order node expansions such that a node to be expanded next is a close neighbor of a current node and derive an intermediate graph of the selected node by modifying the intermediate graph of the current node.

14. The system as set forth in claim 13 wherein the diagnosis comprises diagnosis, prognosis and analysis of state of health of the system.

15. The system set forth in claim 13 wherein the system is an image rendering system.

* * * * *